United States Patent
Sonninen et al.

(10) Patent No.: US 9,366,464 B2
(45) Date of Patent: Jun. 14, 2016

(54) DEVICE FOR SEPARATING DROPLETS

(75) Inventors: Jyrki Sonninen, Raisio (FI); Valtteri Haavisto, Turku (FI)

(73) Assignee: VAHTERUS OY, Kalanti (FI)

( * ) Notice: Subject to any disclaimer, the term of this patent is extended or adjusted under 35 U.S.C. 154(b) by 216 days.

(21) Appl. No.: 13/984,432

(22) PCT Filed: Feb. 9, 2012

(86) PCT No.: PCT/FI2012/050123
§ 371 (c)(1),
(2), (4) Date: Aug. 8, 2013

(87) PCT Pub. No.: WO2012/107645
PCT Pub. Date: Aug. 16, 2012

(65) Prior Publication Data
US 2013/0319039 A1 Dec. 5, 2013

(30) Foreign Application Priority Data
Feb. 9, 2011 (FI) ...................................... 20115125

(51) Int. Cl.
*F25B 43/00* (2006.01)
*F25B 39/02* (2006.01)
(Continued)

(52) U.S. Cl.
CPC ............... *F25B 43/00* (2013.01); *B01D 1/305* (2013.01); *F25B 39/02* (2013.01); *F25B 39/022* (2013.01); *F28D 21/0017* (2013.01); *F28F 2235/00* (2013.01); *F28F 2250/00* (2013.01)

(58) Field of Classification Search
CPC ........ F25B 39/02; F25B 39/022; F25B 43/00; F25B 2339/024; F28D 9/0043; F28D 21/0017; F28D 2021/0071; F28F 9/005; F28F 2235/00; F28F 2250/00; F28F 2250/02; F28F 9/0265; F28F 2245/00; B01D 1/305
See application file for complete search history.

(56) References Cited

U.S. PATENT DOCUMENTS 2,303,247 A * 11/1942 Woods .......................... 165/148
3,008,538 A * 11/1961 Glasgow ......................... 96/190
(Continued)

FOREIGN PATENT DOCUMENTS

| CN | 101194133 A | 6/2008 |
| CN | 101600918 A | 12/2009 |

(Continued)

OTHER PUBLICATIONS

International Search Report for PCT/FI2012/050123 mailed May 29, 2012.

*Primary Examiner* — Mohammad M Ali
*Assistant Examiner* — Christopher R Zerphey
(74) *Attorney, Agent, or Firm* — Nixon & Vanderhye P.C.

(57) ABSTRACT

The invention relates to a device (1) for separating droplets, which comprises—an outer casing (2), which has a substantially horizontal cylindrical shell (14) and substantially vertical ends (9);—an inlet connection (7) for a substance to be vaporized for leading a substance to be vaporized into the outer casing;'—a plate pack (3) functioning as an evaporator, which is arranged inside the outer casing, in its lower part (23);—an inlet connection (10) and an outlet connection (11) for a heating substance for leading a heating substance into the plate pack and out of it;—a gravitational droplet separator (4), which is arranged inside the outer casing, above the plate pack;—an outlet connection (8) for vaporized substance for leading the vaporized substance out of the outer casing from its upper part (15);—one or more filler units (12*a*, 12*b*) arranged between the outer casing (2) and the plate pack (3) for decreasing the liquid volume of the substance to be vaporized inside the outer casing. The invention is suited to be used for example as a flooded evaporator (3) of a refrigerating machinery and a thereto related droplet separator (4, 5).

11 Claims, 3 Drawing Sheets

(51) Int. Cl.
    *B01D 1/30*      (2006.01)
    *F28D 21/00*      (2006.01)

(56) References Cited

U.S. PATENT DOCUMENTS

| | | | | |
|---|---|---|---|---|
| 3,326,280 A | * | 6/1967 | Grenier et al. | 165/161 |
| 3,384,160 A | * | 5/1968 | Beurtheret | 165/74 |
| 6,178,293 B1 | * | 1/2001 | Clasen et al. | 392/496 |
| 2005/0039486 A1 | * | 2/2005 | Knoll | 62/512 |
| 2008/0041096 A1 | * | 2/2008 | Sakashita et al. | 62/515 |
| 2008/0190591 A1 | * | 8/2008 | Ayub | 165/158 |
| 2013/0192295 A1 | * | 8/2013 | Kolbe | 62/512 |

FOREIGN PATENT DOCUMENTS

| | | |
|---|---|---|
| CN | 101936627 A | 1/2011 |
| DE | 44 14 621 | 10/1995 |

* cited by examiner

DEVICE FOR SEPARATING DROPLETS

This application is the U.S. national phase of International Application No. PCT/FI2012/050123 filed 9 Feb. 2012 which designated the U.S. and claims priority to FI 20115125 filed 9 Feb. 2011, the entire contents of each of which are hereby incorporated by reference.

TECHNICAL FIELD OF THE INVENTION

The invention relates to a device for separating droplets for example after a Plate&Shell™ type evaporator with a plate structure. The arrangement according to the invention is used to ensure that no drops are carried from the evaporator for example to a compressor used in a refrigerating machinery.

PRIOR ART

One important application of plate heat exchangers is a so-called flooded evaporator, which is used in large refrigerating machineries, and a droplet separator related thereto. The task of the droplet separator is to ensure that refrigerant droplets are not carried to the compressor of the refrigerating machinery. Therefore the droplet separator is quite often dimensioned to be excessively large, so that the gravitational droplet separation would occur with a sufficient efficiency. The large size of the droplet separator increases production costs and the mass of the system, and the space it requires is large.

Evaporator droplet separator systems are previously known, in which a plate heat exchanger functioning as an evaporator and a droplet separator are fitted into different shell parts and containers are advantageously fitted on top of each other. Such a structure is presented for example in Finnish patent publication FI 120893 B. Disadvantages with such as structure are among others its large size and surplus pipework. The need for space is large especially in the vertical direction. The so-called evaporation surface also remains small in this type of devices and the speed in the ascending pipes is so high that the droplets are not separated by gravitation.

Publication U.S. Pat. No. 7,472,563 B2 presents an evaporator droplet separator, where the plate pack functioning as an evaporator and the droplet separator are fitted inside the same shell part. The amount of refrigerant to be vapourised has been reduced by making the plates of the plate pack in the shape of a semicircle. In such a solution the flow conditions in the plate pack are difficult to manage. A plate pack with a special shape also increases manufacturing costs, whereby the apparatus easily becomes expensive.

OBJECT OF THE INVENTION

It is an object of the present invention to reduce or even eliminate the above-mentioned problems appearing in prior art.

It is an object of the present invention to provide a solution, with which the flooded evaporator and the droplet separator form an entity, which is functionally efficient, economical, small in size and functionally reliable.

It is an important object of the present invention to provide a solution, where the amount of refrigerant or other substance to be vapourised is as small as possible.

It is an object of the present invention to combine gravitational droplet separation and droplet separation based on filtration, i.e. on a demister.

DESCRIPTION OF THE INVENTION

In order to realise among others the above mentioned objects, the device according to the invention and other objects of the invention are characterised by what is presented in the characterising part of the enclosed independent claim.

The embodiment examples and advantages mentioned in this text are in suitable parts applicable to both the device according to the invention and to other applications of the invention, even if this is not always specifically mentioned.

A typical device according to the invention for separating droplets comprises
 an outer casing, which has a substantially horizontal cylindrical shell and substantially vertical ends;
 an inlet connection for a substance to be vapourised for leading a substance to be vapourised into the outer casing;
 a plate pack functioning as an evaporator, which is arranged inside the outer casing, in its lower part;
 an inlet connection and an outlet connection for a heating substance for leading a heating substance into the plate pack and out of it;
 a gravitational droplet separator, which is arranged inside the outer casing, above the plate pack;
 an outlet connection for vapourised substance for leading the vapourised substance out of the outer casing from its upper part.

One or more filler units have been arranged inside the outer casing, between the outer casing and the plate pack, which filler units are arranged to decrease the liquid volume of the substance to be vapourised inside the outer casing.

The outer casing typically functions as a pressure vessel.

Because the cylindrical shell in the device according to the invention is usually horizontal, the term longitudinal direction of the outer casing or cylindrical shell used in this text typically means the horizontal direction. For example if the cylindrical shell of the outer casing is a straight circular cylinder, then its longitudinal direction is the same as the direction of the central axis of the cylinder in question.

The liquid level of the substance to be vapourised, such as the refrigerant or other liquid to be vapourised, is advantageously adjusted to the level of the diameter of the cylindrical shell, whereby the surface area of the substance to be vapourised is as large as possible and the production of vapour per surface area is as small as possible. The ascension speed of the vapour is thus also as small as possible, whereby the generated droplets travelling with the vapour more easily fall back down. Thus the gravitational droplet separation is made more efficient.

The liquid volume of a typical evaporator according to the invention has been decreased so that at least one filler unit has been fitted between the plate pack and the cylindrical shell. Longitudinal filler units have advantageously been arranged on both side of the plate pack, which plate pack is in the longitudinal direction of the cylindrical shell. The filler units can be shaped according to need to decrease the liquid volume as much as possible. A plate pack in the longitudinal direction of the cylindrical shell means that a plate pack formed by heat exchange plates arranged on top of each other is arranged inside the cylindrical shell so that the longitudinal direction of the plate pack is the same as the longitudinal direction of the cylindrical shell.

A typical filler unit is manufactured from a material, which can withstand conditions prevailing in the device. For example in refrigerating devices the filler unit must typically withstand ammonia without corroding.

An advantage of the invention is a large evaporation surface area of the substance to be vapourised in relation to the liquid volume. Thus the evaporation is made more efficient, the droplet formation is decreased and the gravitational droplet separation is facilitated.

The present invention is economical because the components to be used can be standard parts or otherwise widely used. For example the plate pack of the evaporator can be a normal circular welded structure formed of heat exchange plates. For example the applicant's own welded plate pack consisting of circular heat exchange plates arranged on top of each other, which is used in Plate&Shell™ heat exchangers, can be used as the plate pack. The filler units can be manufactured from an inexpensive material.

In one embodiment of the invention the device further comprises a demister droplet separator, which is arranged inside the outer casing, in its upper part, beneath the outlet connection for vapourised substance. The demister can be filled with for example steel wool or a corresponding material generating as low a flow resistance as possible. By placing the plate pack functioning as the evaporator, the gravitational droplet separator and the demister inside the same outer casing, a particularly small size and simple structure is obtained for the device.

In one embodiment of the invention the demister is installed approximately horizontally in the longitudinal direction of the cylindrical shell, but diagonally downwards toward the edges of the device in the transverse direction of the cylindrical shell. Thus the part of the outer casing beneath the demister, i.e. the gravitational droplet separator, can be arranged to be as large as possible. The demister simultaneously steers droplets within it in a controlled manner downwards toward the edges of the device.

In one embodiment of the invention the demister consists of one or several vapour-permeable demister parts and a vapour-impermeable part. The vapour-impermeable part is typically installed directly beneath the outlet connection for vapourised substance.

In one embodiment of the invention a flow channel for the substance to be vapourised and for the generated vapour has been arranged between one or more filler units and the plate pack. In one embodiment of the invention a flow channel for the substance to be vapourised and for the generated vapour has been arranged between the filler unit and the cylindrical shell. The flows and the heat exchange are made more efficient with suitable flow channels. In said flow channels the distance between the filler unit and the plate pack or the filler unit and the inner surface of the cylindrical shell can be for example 5-100 mm or 5-50 mm or 10-30 mm. In the horizontal direction said flow channels can have the length of at least almost the entire plate pack or cylindrical shell. Whether liquid or vapour travels in the flow channels and in which ratio and in which direction, depends on the situation at any time.

In one embodiment of the invention the inner surface of the cylindrical shell and the outer surface of the filler unit toward it are mutually substantially identical in shape. In one embodiment of the invention the outer surface of the plate pack and the outer surface of the filler unit toward it are mutually substantially identical in shape. For example if the inner surface of the cylindrical shell and the outer surface of the plate pack have the cross-sectional shape of circular arches, the sides of the filler unit to be placed between them can be shaped as circular arches with a corresponding radius.

In one embodiment of the invention the upper edge of the filler unit is arranged to be substantially horizontal. In one embodiment of the invention the liquid level of the substance to be vapourised is arranged to be slightly, for example 10-100 mm or 20-50 mm, below the upper edge of the filler unit.

In one embodiment of the invention the plate pack is substantially a circular cylinder, whereby the outer diameter of the plate pack is 30-70% or 40-60% of the inner diameter of the cylindrical shell. The plate pack is typically situated to be acentric in relation to the cylindrical shell, in the lower part of the cylindrical shell.

In one embodiment of the invention the filler unit is manufactured from plastic, such a HDPE, LDPE, expanded polystyrene or a corresponding material.

In one embodiment of the invention the filler unit is manufactured from metal, for example steel, such as carbon steel or stainless steel.

In one embodiment of the invention the filler unit is manufactured from several plates attached together, which plates are substantially in the direction of the end of the outer casing. The attaching of the plates can be done for example with bolts or by gluing. The plates can be made of for example plastic or metal.

In one embodiment of the invention the filler unit is manufactured from one uniform piece.

In one embodiment of the invention the filler unit is attached to the inner surface of the cylindrical shell. The attaching can be done for example with collar-like or plate-like fasteners.

In one embodiment of the invention the filler unit comprises a casing and a space within it. The casing of the filler unit can be watertight. Thus the substance to be vapourised cannot pass into the space inside the filler unit. The casing of the filler unit can for example be manufactured from metal plate.

In one embodiment of the invention the space inside the casing of the filler unit is filled with a filler, such a concrete, sand, plastic such as expanded polystyrene or some other suitable substance.

In one embodiment of the invention the inlet connections for the substance to be vapourised are fitted into the end of the outer casing or the bottom of the cylindrical shell.

In one embodiment of the invention the demister droplet separator comprises two superposed perforated plates or the like, the space between which is filled with highly gas-permeable steel wool or a corresponding material.

In one embodiment of the invention there is a collector channel in the longitudinal direction of the cylindrical shell beneath the outlet connection for the vapourised substance, the bottom of which collector channel has the shape of a low-gradient downwards-opening V. Thus droplets ending up therein are steered downwards. The bottom of the collector channel can be vapour-impermeable.

The device according to the invention is very well suited for use for example as a flooded evaporator of a refrigerating machinery and a thereto related droplet separator.

BRIEF DESCRIPTION OF THE FIGURES

The invention is described in more detail below with reference to the enclosed schematic drawing, in which.

DETAILED DESCRIPTION OF THE EXAMPLES OF THE FIGURES

For the sake of clarity, the same reference numbers are used for corresponding parts in different embodiments. The travel directions of the liquids and vapours are illustrated with arrows.

Figure 1:
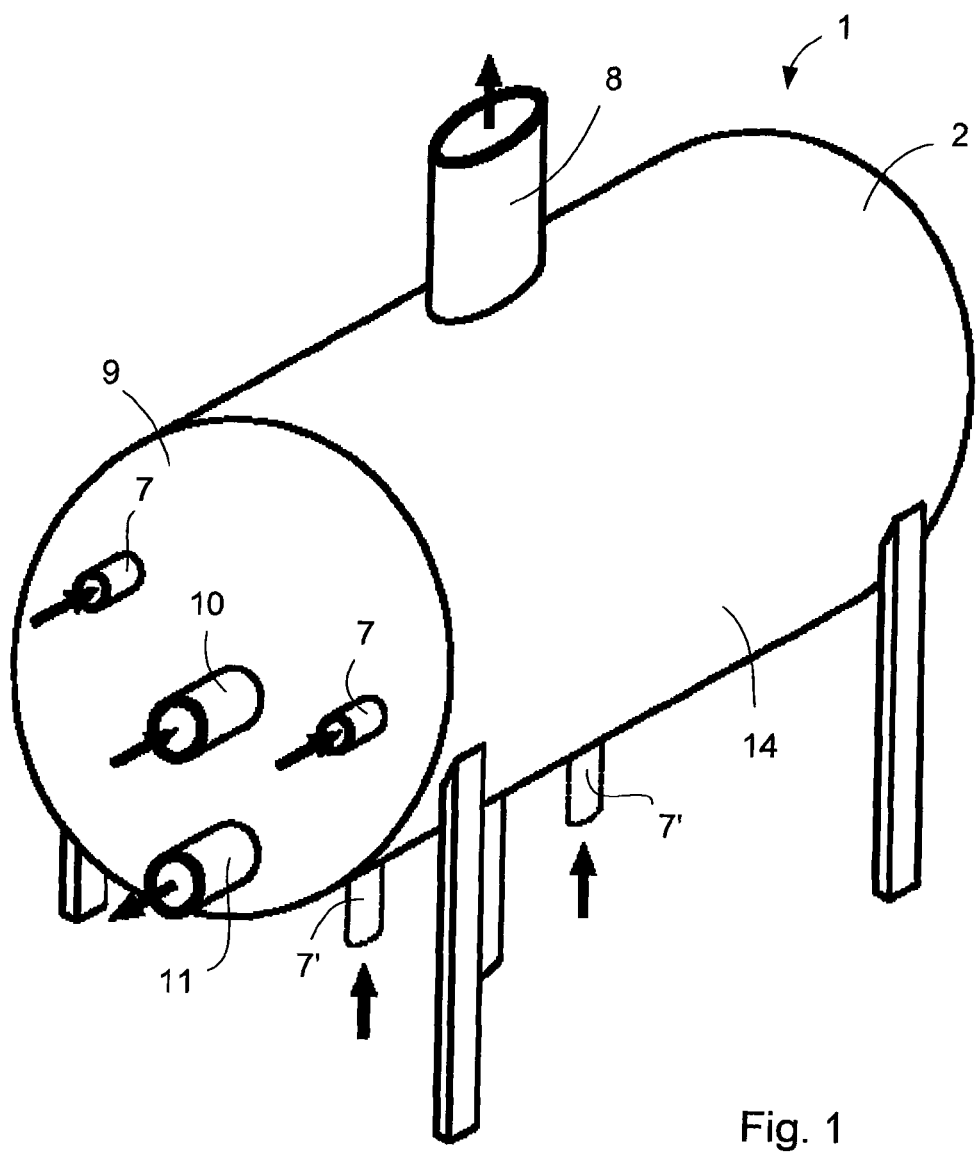
FIG. 1 shows a principle view according to the invention of a device according to the invention, where the inlet connections for a substance to be vapourised are placed in the end of the device.
Figure 2:
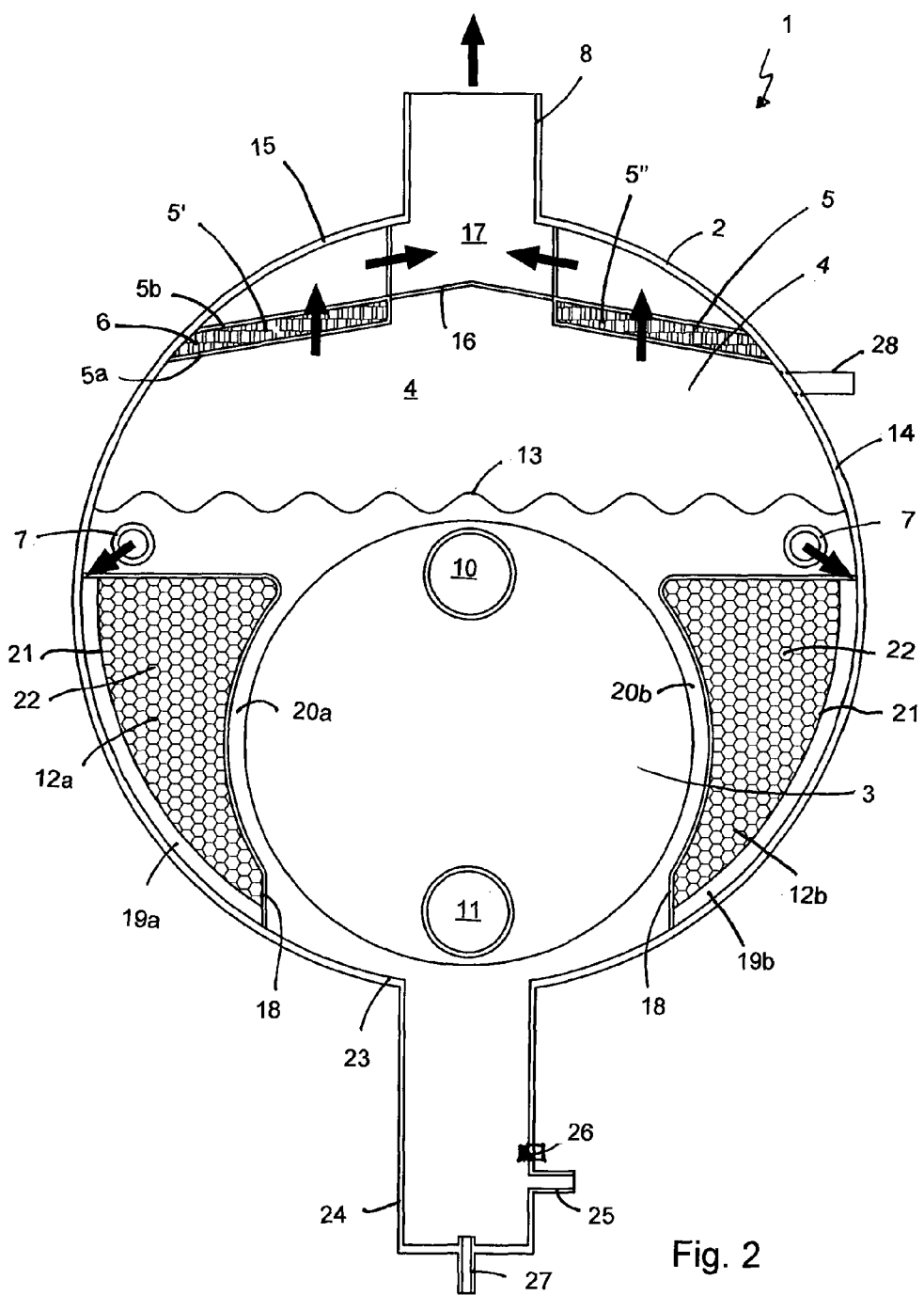
FIG. 2 shows a cross-section of an embodiment of the device according to the invention, where the inlet connections for the liquid to be vapourised are in the end of the device.
Figure 3:
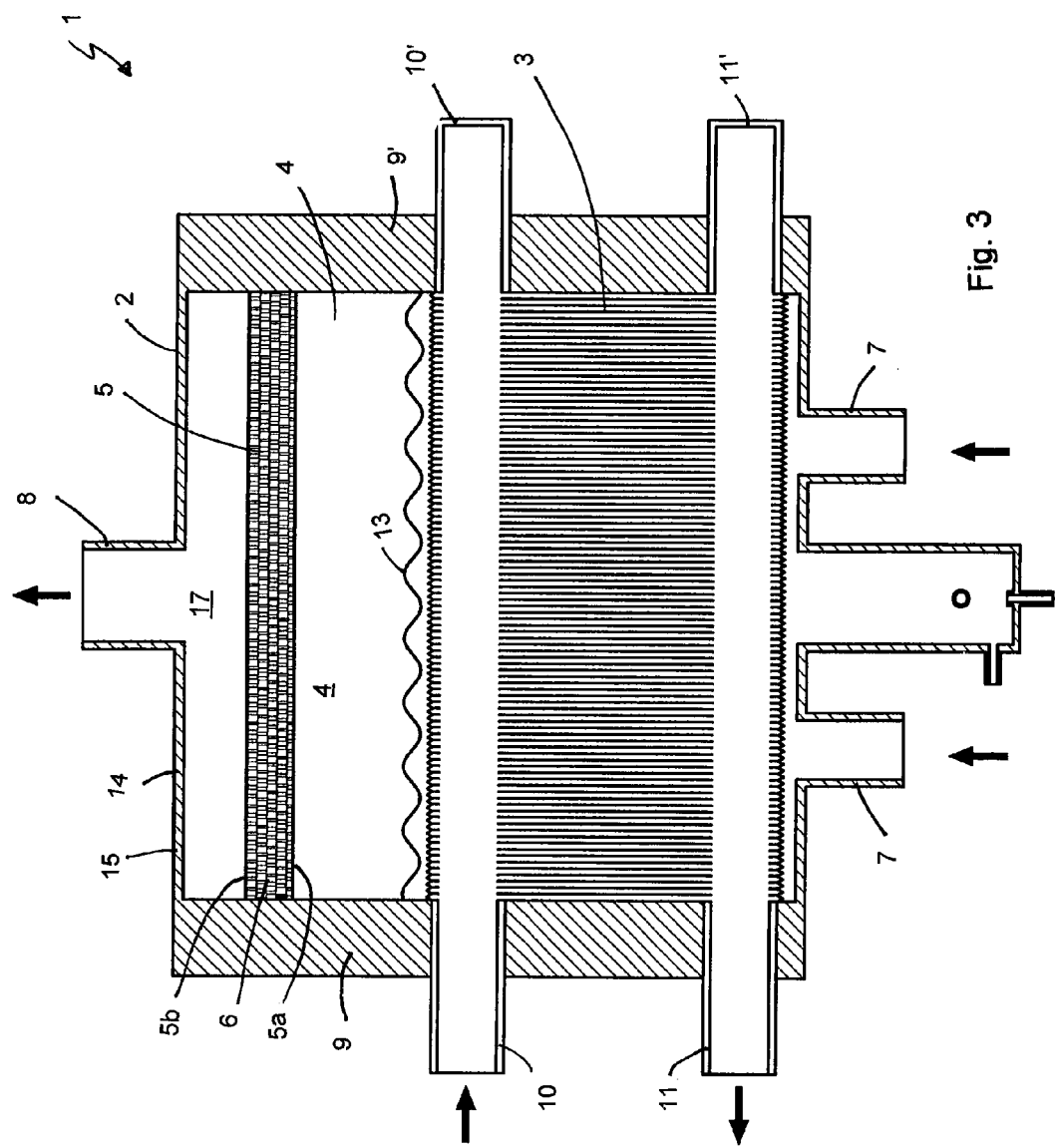
FIG. 3 shows a longitudinal cross-section of an embodiment of the device according to the invention, where the inlet connections for the liquid to be vapourised are in the bottom of the device.

FIGS. 1-3 show evaporator droplet separator devices 1, which have a Plate&Shell™-type plate pack 3 shown for example in FIGS. 2 and 3 fitted into an outer casing 2 functioning as a frame, i.e. for example into a flat-ended cylinder as shown in FIG. 1, in an acentric manner, and a gravitational droplet separator 4 and a demister 5. The demister 5 has two perforated plates or mesh plates 5a, 5b and steel wool 6 installed between them. A substance to be vapourised, for example the refrigerant, is brought into the outer casing 2 from inlet connections 7. The vapourised substance exits from outlet connections 8 in the upper part of the outer casing. A heating substance is brought through the end 9 of the outer casing into the plate pack 3 with the inlet connection 10 and removed from the plate pack through the end 9 of the outer casing with the outlet connection 11. The inlet connection 10 and outlet connection 11 continue through the plate pack 3, evening out the flow of the heating substance over the entire plate pack 3. In some embodiments, as in shown in FIG. 3, closed connections 10' and 11' are arranged through the second end 9' of the device, which closed connections can be opened later. The outer surfaces of the plate pack 3 function as heat exchange surfaces of the evaporator. FIG. 2 shows filler units 12a and 12b placed between the outer casing 2 and the plate pack 3. The liquid level 13 of the substance to be vapourised has been drawn to be visible in FIGS. 2 and 3.

The inlet connections 7 for the substance to be vapourised have in FIGS. 1 and 2 been placed through the end 9 of the outer casing and in FIG. 3 in the lower part of the outer casing, through the cylindrical shell 14. The placement of the inlet connections 7 is determined according to the need at any time. It is often advantageous, as is shown in the example of FIGS. 1 and 2, that the inlet connections 7 bring the substance to be vapourised above the filler units 12a, 12b, but beneath the liquid level 13. Inlet connections 7 placed in the end 9 can be continued inside the outer casing for example with separate inner pipes (not shown), whereby the liquid to be vapourised can be divided evenly over the entire length of the device 1. Alternative inlet connections 7' for the substance to be vapourised have been drawn in FIG. 1 with dotted lines in the bottom of the device.

The liquid level 13 of the liquid to be vapourised, such as the refrigerant, is advantageously adjusted approximately to the level of the diameter of the cylindrical shell of the outer casing.

From the liquid level 13 vapour rises up through the gravitational droplet separator 4 of the upper part 15 of the cylindrical shell of the device. The vapour hits the lower perforated plate 5a of the demister 5 in the upper part of the cylindrical shell and passes through it. The vapour thereafter passes through the steel wool layer 6 fitted on top of the perforated plate 5a, which steel wool functions as a demister and separates fine droplets from the vapour. A second perforated plate 5b is installed on top of the steel wool 6 to support the structure. After passing through the second perforated plate 5b the vapour can exit through the outlet connection 8 in the upper part of the outer casing. From there the vapourised refrigerant is led onward, for example to the compressor of a refrigerating apparatus (not shown). The demister 5 and its perforated plates 5a and 5b have the length of the entire cylindrical shell 14. Both the perforated plates 5a and 5b and the steel wool 6 should be as gas-permeable as possible, so that pressure losses do not excessively decrease the efficiency and power of the device 1.

In one embodiment, as in the example of FIG. 2, the demister consists of two vapour-permeable demister parts 5' and 5" arranged on both sides of the outlet connection 8 for the vapour, and a whole plate 16 arranged between them, beneath the outlet connection 8. The demister parts 5' and 5" are installed approximately horizontally in the longitudinal direction of the cylindrical shell and at the same time diagonally downwards from the midpoint of the cylindrical shell toward the edges of the device, on both sides of the outlet connection 8. The demister parts are attached for example by welding to the inner surface of the outer casing, so tightly that the vapour must pass through the demister part on its way to the outlet connection 8. A whole plate 16 with a downwards-opening V profile is fitted as a bottom to the longitudinal channel 17, which is thus formed by the outlet connection 8 of the vapour, which plate prevents the vapour from passing from below straight to the outlet connection 8. Droplets generated in the channel 17 also flow away along the plate 16.

The liquid volume of the device 1 has been decreased so that longitudinal filler units 12a and 12b have been fitted on both sides between the plate pack 3 and the cylindrical shell 14. The filler units 12a and 12b are shaped to decrease the liquid volume as much as possible. The filler units are attached in place for example with plates or collars 18, which have their shape. Flow channels 19a and 19b are left between the filler unit and the cylindrical shell 14. Flow channels 20a and 20b are left between the filler unit and the plate pack 3. Along the flow channels the liquid to be vapourised can sink and the generated vapour can rise. The flow channel 19a, 19b between the filler unit 12a, 12b and the cylindrical shell 14 is important especially in embodiments according to the invention (such as FIGS. 1 and 2), where the inlet connections 7 for substance to be vapourised are in the end 9 of the outer casing and open up inside the device above the filler units 12a, 12b. Thus liquid substance to be vapourised can flow efficiently past the filler units 12a, 12b to the lower part 23 of the outer casing and thus also to the lower part of the plate pack 3.

The casing 21 of the filler units 12a, 12b is substantially watertight. It can be manufactured for example from metal plate or plastic. Inside the filler units 12a, 12b there is a filler 22, for example expanded polystyrene.

In FIG. 2 the inner surface of the cylindrical shell 14 and the outer surface of the filler unit 12a, 12b toward it have a mutually substantially identical cross-section, in this example circular arches with the same radius. In FIG. 2 the outer surface of the plate pack 3 and the outer surface of the filler unit 12a, 12b toward it also have a mutually substantially identical cross-section, in this example also circular arches with the same radius.

An oil removal cup 24 has been fitted in to the lower part 23 of the outer casing, in its bottom, in the side of which cup there is an oil removal connection 25 and a level sensor 26 and in the bottom a discharge connection 27.

Beneath the demister 5 there is a surface sensor 28 for monitoring the liquid level of the substance to be vapourised.

The figures show only a few preferred embodiments according to the invention. Facts of secondary importance with regards to the main idea of the invention, facts known as such or evident for a person skilled in the art, such as power sources or support structures possibly required by the invention, are not separately shown in the figures. It is apparent to a person skilled in the art that the invention is not limited exclusively to the examples presented above, but that the invention may vary within the scope of the claims presented below. The dependent claims present some possible embodiments of the invention, and they are as such not to be considered to restrict the scope of protection of the invention.

The invention claimed is:

1. A device for separating droplets comprising:
   an outer casing having a substantially horizontal cylindrical shell defining an interior space by a substantially horizontal cylindrical interior surface and substantially vertical ends closing the interior space;
   an inlet connection for leading a vaporisable substance into the outer casing;
   a cylindrical plate pack functioning as an evaporator which is arranged inside the interior space at a lower part of the outer casing, the cylindrical plate pack defining a cylindrical external surface;
   an inlet connection for leading a heating substance into the plate pack and an outlet connection for leading the heating substance out of the plate pack;
   a gravitational droplet separator arranged inside the outer casing above the plate pack;
   an outlet connection for leading vapourised substance out of an upper part of the outer casing; and
   filler units longitudinally arranged on both sides of the cylindrical plate pack inside the outer casing to thereby decrease liquid volume of the vaporisable substance inside the outer casing, wherein
   each filler unit includes a casing which defines a filler space and has a solid filler material filling the filler space, and wherein
   the casing includes cylindrically arcuate outer and inner faces having substantially the same radius as the cylindrical interior and external surfaces of the cylindrical shell and plate pack, respectively, and wherein
   the cylindrically arcuate outer and inner faces of the casing are spaced from the cylindrical interior surface of the cylindrical shell and the cylindrical external surface of the plate pack to define first and second flow channels therebetween for the vaporisable and vaporized substances, respectively.

2. The device according to claim 1, further comprising a demister droplet separator arranged inside the upper part of the outer casing beneath the outlet connection for the vapourised substance.

3. The device according to claim 1, wherein the plate pack is substantially a circular cylinder, and wherein an outer diameter of the plate pack is 30-70% of an inner diameter of the cylindrical shell.

4. The device according to claim 1, wherein the filler units comprise several plates attached together, wherein the plates are oriented in a substantially vertical direction relative to the substantially vertical ends of the outer casing.

5. The device according to claim 1, wherein the filler units are attached to an inner surface of the cylindrical shell with collar-like or plate-like fasteners.

6. The device according to claim 1, wherein the inlet connections for the vaporisable substance are fitted either in the ends of the outer casing or in a bottom of the cylindrical shell.

7. The device according to claim 2, wherein the demister droplet separator comprises two superposed perforated plates defining a space therebetween which is filled with gas-permeable steel wool.

8. The device according to claim 1, further comprising a collector channel positioned beneath the outlet connection for vapourised substance, wherein the collector channel is oriented in a longitudinal direction of the cylindrical shell, and wherein the collector channel has a low-gradient downwardly-opening V-shaped bottom to cause liquid droplets to be downwardly directed thereby.

9. The device according to claim 3, wherein the outer diameter of the plate pack is 40-60% of the inner diameter of the cylindrical shell.

10. The device according to claim 1, wherein the solid filler material is selected from the group consisting of concrete, sand and expanded polystyrene.

11. A refrigerating apparatus which comprises the device according to claim 1 as a flooded evaporator, and a droplet separator operatively associated with the device.

* * * * *